(12) United States Patent
Zubow et al.

(10) Patent No.: US 9,306,711 B2
(45) Date of Patent: Apr. 5, 2016

(54) METHOD OF ASSEMBLING A FRAME IN AN ORTHOGONAL FREQUENCY DIVISION MULTIPLE ACCESS (OFDMA)-BASED COMMUNICATION SYSTEM AND COMMUNICATION SYSTEM

(75) Inventors: Anatolij Zubow, Heidelberg (DE); Xavier Perez Costa, Heidelberg (DE); Daniel Camps Mur, Heidelberg (DE); Julio Arauz, Leimen (DE); Paolo Favaro, Heidelberg (DE)

(73) Assignee: NEC EUROPE LTD., Heidelberg (DE)

( * ) Notice: Subject to any disclaimer, the term of this patent is extended or adjusted under 35 U.S.C. 154(b) by 1241 days.

(21) Appl. No.: 12/745,307

(22) PCT Filed: Nov. 28, 2007

(86) PCT No.: PCT/EP2007/010322
§ 371 (c)(1),
(2), (4) Date: Sep. 29, 2010

(87) PCT Pub. No.: WO2009/068053
PCT Pub. Date: Jun. 4, 2009

(65) Prior Publication Data
US 2011/0026546 A1   Feb. 3, 2011

(51) Int. Cl.
  *H04J 1/00*    (2006.01)
  *H04L 5/00*    (2006.01)
  *H04L 27/26*   (2006.01)
  *H04L 12/861*  (2013.01)
  *H04W 72/10*   (2009.01)
(52) U.S. Cl.
  CPC ............ *H04L 5/0007* (2013.01); *H04L 5/0037* (2013.01); *H04L 27/2602* (2013.01); *H04L 49/90* (2013.01); *H04L 5/0064* (2013.01); *H04W 72/10* (2013.01)

(58) Field of Classification Search
  None
  See application file for complete search history.

(56) References Cited

U.S. PATENT DOCUMENTS

| 8,130,741 | B2 * | 3/2012 | Bae et al. | 370/344 |
| 8,311,025 | B2 * | 11/2012 | Lin et al. | 370/343 |
| 2007/0070905 | A1 * | 3/2007 | Oliver et al. | 370/235 |
| 2007/0263528 | A1 * | 11/2007 | Mukherjee | 370/208 |

FOREIGN PATENT DOCUMENTS

| JP | 2007-243488 A | 9/2009 |
| WO | 2007/128135 | 11/2007 |

OTHER PUBLICATIONS

Seungwan Ryu et al., "Urgency and Efficiency based Wireless Downlink Packet Scheduling Algorithm in OFDMA System", IEEE 61st Vehicular Technology Conference, vol. 3, May 30, 2005-Jun. 1, 2005, pp. 1456-1462, XP010855664, NJ, USA, ISBN: 978-0-7803-8887-1.
Desset C. et al., "WiMAX Downlink OFDMA Burst Placement for Optimized Receiver Duty-Cycling", IEEE International Conference on Communications ICC '07, Jun. 1, 2007, pp. 5149-5154, XP031126484, NY, USA ISBN: 978-1-4244-0353-0.
International Search Report dated Oct. 9, 2008, from corresponding PCT application.
Translation of Japanese Office Action, dated May 30, 2012, from corresponding JP application.

* cited by examiner

*Primary Examiner* — Rhonda Murphy
(74) *Attorney, Agent, or Firm* — Young & Thompson

(57) ABSTRACT

A method of assembling a frame in an Orthogonal Frequency Division Multiple Access (OFDMA)-based communication system, wherein data packets to be transmitted from a broadcast station to a receiver are given a rectangular shape in terms of the two dimensions—time and frequency—of the OFDMA frame, and wherein the data packets are successively fitted into the OFDMA frame by way of a frame assembly scheduler, is characterized in that the filling process of the OFDMA frame is based on an ordered list of data structures that represent the current empty space within the OFDMA frame. Furthermore, a corresponding communication system is disclosed.

22 Claims, 4 Drawing Sheets

METHOD OF ASSEMBLING A FRAME IN AN ORTHOGONAL FREQUENCY DIVISION MULTIPLE ACCESS (OFDMA)-BASED COMMUNICATION SYSTEM AND COMMUNICATION SYSTEM

The present invention relates to a method of assembling a frame in an Orthogonal Frequency Division Multiple Access (OFDMA)-based communication system, wherein data packets to be transmitted from a broadcast station to a receiver are given a rectangular shape in terms of the two dimensions—time and frequency—of the OFDMA frame, and wherein the data packets are successively fitted into the OFDMA frame by means of a frame assembly scheduler.

Furthermore, the present invention relates to a communication system, comprising a broadcast station for Orthogonal Frequency Division Multiple Access (OFDMA)-based transmission of data packets to a receiver, a data packet shaping entity for giving data packets to be transmitted a rectangular shape in terms of the two dimensions—time and frequency—of the OFDMA frame, and a frame assembly scheduler for successively fitting data packets to be transmitted into the OFDMA frame.

BACKGROUND OF THE INVENTION

OFDMA (Orthogonal Frequency Division Multiplexing Access) is a nowadays widespread technology for data transmission which is based on the usage of a large number of closely-spaced orthogonal sub-carriers. In particular in wireless communication systems OFDMA becomes more and more popular and has been named as a candidate for future 4G standards.

As an example for the application of OFDMA in wireless communication systems it is to be referred to WiMAX. WiMAX is defined as World Wide Interoperability for Microwave Access based upon the standards family of IEEE 802.16. Just as the Wi-Fi Alliance certifies interoperable implementations of the IEEE 802.11 wireless LAN standard, the WiMAX Forum certifies interoperable implementations of IEEE 802.16 wireless standards.

In WiMAX, the frame filling process in the downlink direction is performed by a frame assembly scheduler that we refer as Downlink MAP (DL-MAP) scheduler. The job of a DL-MAP scheduler is to allocate downlink data packets, so called MPDUs (MAC Protocol Data Units), of a given size in bits into the downlink portion of a WiMAX frame. According to the two current WiMAX standards IEEE 802.16-2004 and 802.16e-2005, a WiMAX frame consists of a specific two dimensional area, wherein the two dimensions of the WiMAX frame are given in form of slots (time) and subchannels (frequency).

The task of the DL-MAP scheduler can be decomposed in two basic subtasks. First, it has to fit the previously mentioned MPDUs into rectangular shapes, defined as bursts in the WiMAX standards, where a specific MCS (Modulation and Coding Scheme) will be applied. By concatenating MPDUs belonging to different connection identifiers (CID) in a single burst the signaling overhead due to the DL-MAP size can be reduced. Second, it has to pack these bursts together within the rectangular WiMAX downlink frame minimizing the unused space that translates into a better exploitation of radio resources.

The two current WiMAX standards mentioned above do not provide any guidance about how a base station (and a DL-MAP scheduler, respectively) should realize the previously mentioned tasks. The performance of the system highly depends on the DL-MAP scheduler algorithm since it determines how efficiently the radio resources are used. The efficiency of the frame assembly scheduler is determined by the size of the empty space left at the end of the frame assembly as well as the amount of padding required to make the rectangles fit in the area of interest. Empty space and padding are wasted radio resources (i.e. bandwidth).

It is therefore an object of the present invention to improve and further develop a method and a communication system of the initially described type in such a way that the efficiency of radio resources usage in terms of empty spaces and padding in the OFDMA frame is enhanced and that the complexity required for the frame assembly scheduler is minimized.

SUMMARY OF THE INVENTION

In accordance with the invention, the aforementioned object is accomplished by a method characterized in that the filling process of the OFDMA frame is based on an ordered list of data structures that represent the current empty space within the OFDMA frame.

Furthermore, the aforementioned object is accomplished by a communication system characterized in that the frame assembly scheduler is configured to perform the filling process of the OFDMA frame based on an ordered list of data structures that represent the current empty space within the OFDMA frame.

According to the invention it has been recognized that the complexity required for the frame assembly scheduler can be reduced by converting the two dimensional packing problem into a searching problem. An exhaustive search is not feasible due to the tight time-boundaries the DL-MAP scheduler has to be compliant with. The frame assembly procedure, in fact, needs to be done within the WiMAX frame duration. Considering this, it has been recognized that a greedy search with a heuristic metric is the most suitable solution. To this end the invention proposes to base the allocation process of the OFDMA frame on an ordered list of data structures wherein the data structures represent the current empty space within the OFDMA frame. It has been recognized that by means of the usage of said list the problem of allocating rectangular data packets in an OFDMA frame can be solved with high efficiency. The usage of said list allows considering for each data packet all feasible dimension permutations, leading to explore all possible rectangular shapes.

According to an advantageous embodiment, before starting the allocation of data packets in the OFDMA frame, the data packets to be transmitted are divided into urgent data packets and into non-urgent data packets. Consequently, as the urgent data packets are allocated first in order to increase the probability that there is enough empty space in the OFDMA frame, Quality of Service (QoS) requirements can be fulfilled, e.g. in connection with time critical applications. On the other hand, it may happen that after having placed all urgent data packets there is not enough space left for allocating all of the non-urgent data packets. However, as the non-urgent data packets are not related to time critical applications they may be transmitted in a subsequent OFDMA frame without any problems.

Generally, according to a preferred embodiment, data packets before being allocated in the OFDMA frame are concatenated to bursts. Concatenation in this context means the aggregation of different data packets in single bursts. In case of WiMAX, the concatenation of data packets belonging to different Connection Identifiers (CID) to a single burst may be performed according to their Modulation Coding Scheme MCS. In the following, for sake of simplicity, data packets that have been concatenated as well as single data packets (which have not experienced any concatenation) are referred to as bursts.

By applying the concatenation mechanism the signalling overhead due to the DL-MAP size can be reduced. To ensure that urgent data packets/bursts and non-urgent data bursts are not mixed up, it proves to be advantageous to perform the concatenation separately for urgent data packets and for non-urgent data packets. Moreover, a threshold may be applied specifying a maximal admissible size of a burst. By this means bursts of extremely large size are avoided which proves to be useful as such large burst might be difficult to allocate.

In a further advantageous way, the urgent bursts may be allocated within the OFDMA frame according to a fixed order based on the size of the bursts. Preferably, the algorithm starts with the largest burst, as it becomes more and more difficult to find a sufficiently large space for placing larger bursts the smaller the remaining empty space within the OFDMA frame. After having allocated all urgent bursts, the bursts qualified as non-urgent ones may be allocated applying the same fixed temporal order as described above in connection with the urgent bursts.

According to a preferred embodiment, the remaining free space of the OFDMA frame after placing a burst is defragmented into a set of empty rectangles. Advantageously, said list of data structures that represent the current empty space within the OFDMA frame includes said set of empty rectangles ordered in terms of increasing size. In such case, the packing area for the next burst to be allocated within the OFDMA frame may be selected from said list as the smallest empty rectangle that can hold the burst considered. The advantage of such an embodiment lies in the fact that large remaining free rectangles are affected as little as possible thereby increasing the number of bursts that can be allocated within the OFDMA frame.

With regard to a concise structuring of the allocation process, it may be provided that the bursts are always placed in the upper right hand corner of the respective selected packing area. After having selected from the list of defragmented empty rectangles a rectangle as packing area and after knowing where to put the burst within the selected packing area the question remains whether to place the burst vertically or horizontally. As regards a high efficiency the decision is taken in such a way that the resulting defragmented empty rectangles' sizes are maximized. Basically, placements with thin rectangles in the time domain will be preferred in order to save power in end terminals which receive the OFDMA frame and which will have to extract the bursts from the frame.

However, it is to be noted that in general only the size of the bursts to be allocated, i.e. the number of units, that are needed for a burst within the OFDMA frame is known in advance. In contrast, the actual shape or dimensions (in terms of slots and subchannels of the OFDMA frame) of the bursts are not predetermined in any way and may be freely chosen. Insofar the above mentioned problem of whether to allocate a burst vertically or horizontally proves to be more complicated as it will be necessary to determine the specific shape for each burst. In order to cope with this problem and to further increase the efficiency of the allocation process, a rectangular shaping of the bursts is performed in such a way that the size of the biggest remaining free rectangle is maximized. This means that the set of defragmented empty rectangles is calculated for all possible rectangular shapes of the burst to be allocated. The shape that results in the largest remaining free defragmented rectangle is chosen as the packing area for that burst. In a preferred embodiment also padding is taken into consideration in the context of the shaping process.

To give an example for the shaping process, a burst with 26 units is considered. The options for the actual burst dimensions or shapes (in terms of slots and subchannels) including padding are the following: 1 (slot)×26 (subchannels) with no padding, 2×13 with no padding, 3×10 with four units of padding, 4×7 with two units of padding, 5×6 with four units of padding. Of course, there are many more options, which all include more units of padding though. In order to avoid gratuitous padding that will unnecessarily waste space within the OFDMA space, a configurable threshold, in terms of maximum units of padding allowed, may be specified. Options for the actual burst shape/dimension which require more padding than specified by the thresholds may then be neglected.

Before starting with the allocation of bursts within the OFDMA frame, it may be provided that the fixed overhead of the OFDMA frame is allocated. This overhead includes the FCH (Frame Control Header), the UL-MAP (Uplink MAP) and the DL-MAP (Downlink MAP). As the overhead includes broadcast information decoded by all users, it is always placed at the beginning. While the FCH is of a fixed dimension for a given OFDMA system, the size of the UL-MAP and DL-MAP is not necessarily known a priori since, for instance, in the DL-MAP case it depends on the concatenation process and on the number of bursts which are allocated within the OFDMA frame.

Against this background it proves to be advantageous to perform a virtual packing of bursts before starting with the real allocation process. By means of the virtual packing a heuristic value for the initial size of the DL-MAP can be calculated. Based on this value the real allocation process may be started. More specifically, in the context of the virtual packing the two-dimensional packing problem is reduced to a simpler one-dimensional packing. The virtual packing dequeues packets as long as there is sufficient space in the OFDMA frame. It stops if the size of a given burst is greater than the remaining space in the frame (FCH+UL-MAP+DL-MAP+$\Sigma$burst$_i$<$C_{frame}$). For the so determined bursts the size of the required DL-MAP is calculated and used as initial rough estimation for the real 2d-packing.

If it turns out throughout the allocation process that the initial size of the DL-MAP is insufficient and that more space is needed for the DL-MAP, this one may be increased, if possible. The instance that there is not enough space to increase the DL-MAP sufficiently constitutes one of the two cases in which the allocation process will be terminated. The second case in which the allocation process has to be terminated is when the number of units required for allocating any of the remaining data packets or bursts is larger than the size of the largest free rectangle.

After terminating the allocation process it may be provided that an array of packed data packets/bursts and an array of unpacked data packets/bursts are generated. In case of packed data packets/bursts also the position of the bursts within the frame may be returned.

As regards advantageous embodiments of the communication system according to the invention it is to be referred to the advantageous embodiments of the method according to the invention as described above in order to avoid unnecessary repetitions.

There are several ways to design and further develop the teaching of the present invention in an advantageous way. To this end, it is to be referred to the patent claim(s) subordinate to the independent claim(s) and to the following explanation of a preferred example of an embodiment of the invention, illustrated by the figures. In connection with the explanation of the preferred example of an embodiment of the invention by the aid of the figure, generally preferred embodiments and further developments of the teaching will be explained.

DETAILED DESCRIPTION OF THE PREFERRED EMBODIMENTS

Figure 1:
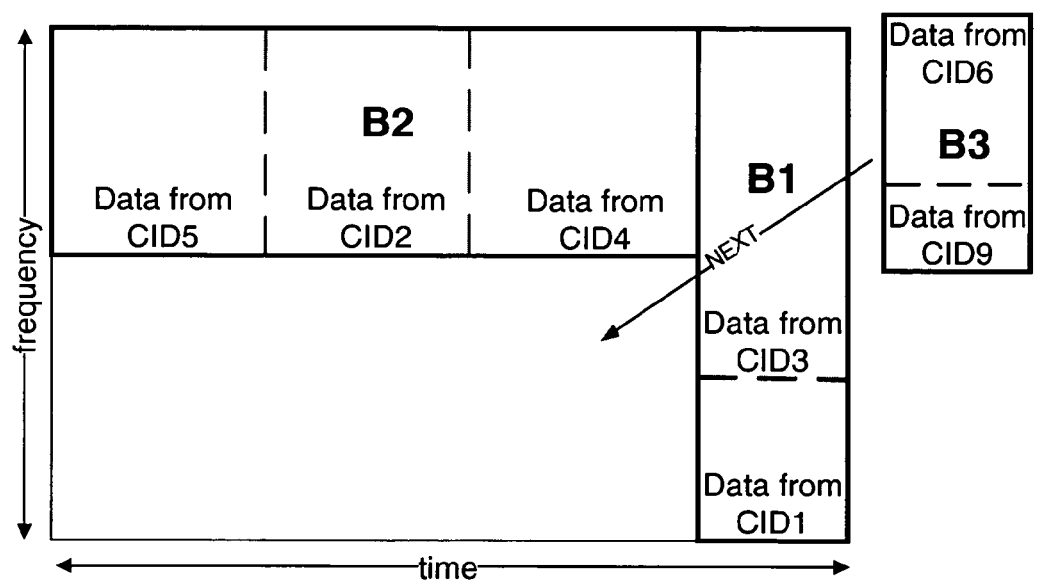
FIG. 1 shows an abstract view of an example of an OFDMA frame and illustrates the data packet concatenation mechanism.

With reference to FIG. 1 a typical OFDMA frame is shown with its two dimensions time (slots) and frequency (subchannels). Furthermore, FIG. 1 generally illustrates the concatenation mechanism that may be applied in connection with the present invention. In principle, each data packet would be allocated within the OFDMA frame separately. However, by applying the concatenation mechanism it is possible to concatenate two or more data packets from different connections to a burst, which then, as a whole, can be allocated within the OFDMA frame. For instance, according to the embodiment shown in FIG. 1 burst B1 includes two concatenated data packets, one data packet from a connection with Connection Identifier CID 1 and another data packet from a connection with CID 3. In the following description, for sake of simplicity, referring to "bursts" refers to bursts as concatenated data packets as described above and, in addition, to single data packets which have not been concatenated.

With reference to FIG. 2, the process of OFDMA frame allocation is illustrated. In the given example the entirety of bursts to be allocated within the OFDMA frame consists simply of three bursts, namely the bursts B1, B2 and B3. However, in real scenarios typically many more bursts will be allocated within one OFDMA frame.

The OFDMA frame considered in the example of FIG. 2 includes 30 sub-channels (on the frequency axis) and 60 slots (on the time axis). Thus, the overall packing space has an area of 30×60=1800 units.

Figure 2A:
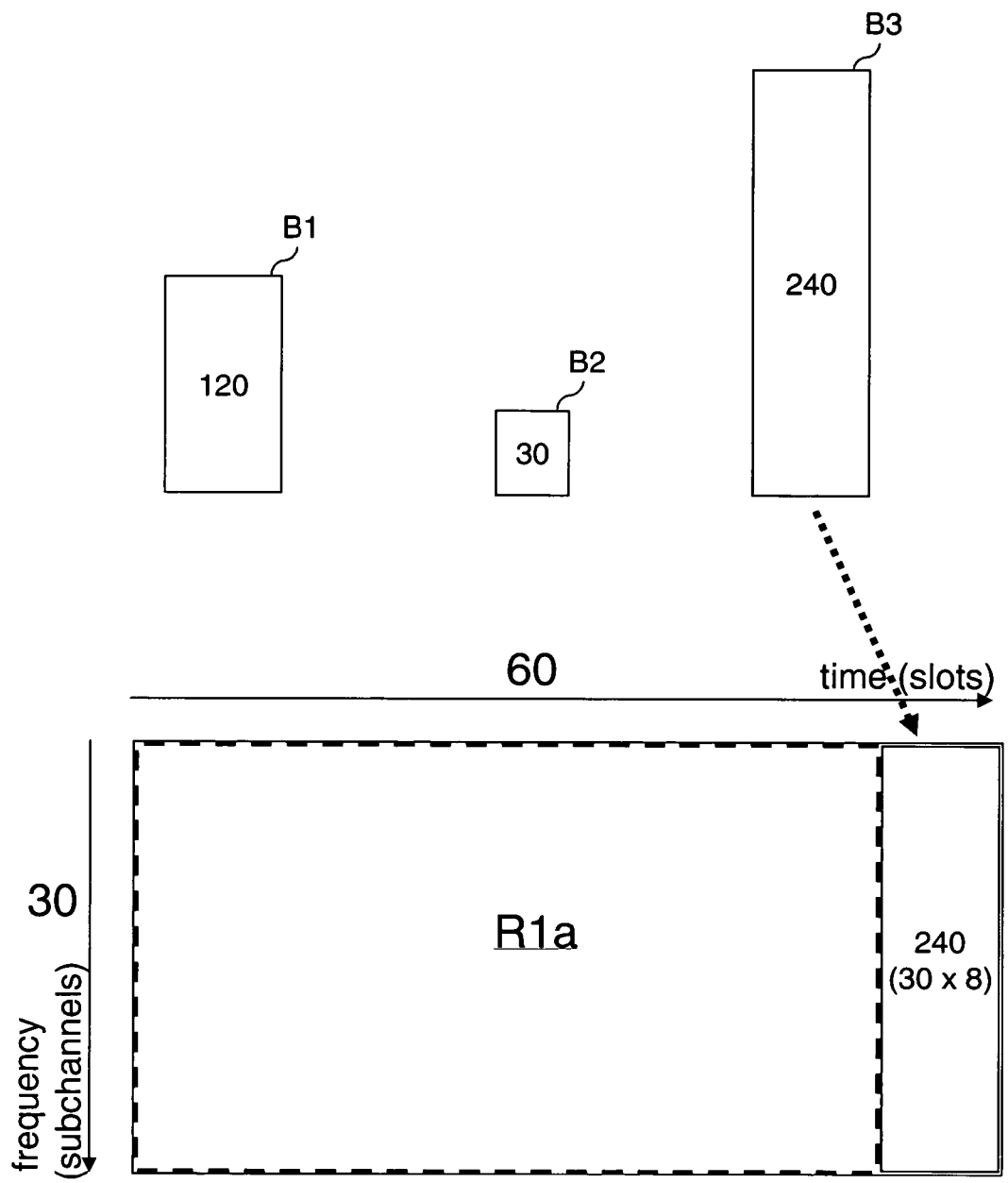
FIG. 2 shows an illustrative allocation process according to an embodiment of the present invention.

FIG. 2a illustrates the allocation of the first burst. As the bursts will be packed in descending order in terms of their size, the first burst to be allocated is burst B3 which is the largest one with 240 units. Bursts are always packed in the upper right hand corner of the selected packing area, which in case of the first burst is the whole OFDMA frame except the space needed for fixed overhead. The fixed overhead includes the FCH, UL-MAP and the DL-MAP which are omitted in FIG. 2 for reason of clarity. The named overhead part is placed at the beginning of the frame, thus starting from the upper left hand corner of the OFDMA frame.

It is to be noted that in advance only the size of the bursts is known, i.e. the number of units needed for allocation. However, the optimal shape/dimension of the bursts, i.e. how the units are distributed between slots and sub-channels of the OFDMA frame, has to be evaluated. According to a preferred embodiment of the invention this evaluation is performed in such a way that the placement of bursts is based on a maximization of biggest free rectangle after placement.

In the specific case shown in FIG. 2a the optimal dimension of burst 83 is 30 sub-channels times 8 slots. Such distribution results in only one free rectangle which covers the resulting free space of the OFDMA frame completely. In FIG. 2a this rectangle has been indicated by the dashed line frame and has been labelled as R1a. After having placed burst 83 in this way, a list of remaining empty rectangles ordered in terms of increasing size. As only rectangle R1a exists as remaining empty rectangle, said list will only include R1a with a size of 30×52=1560 units.

Figure 2B:
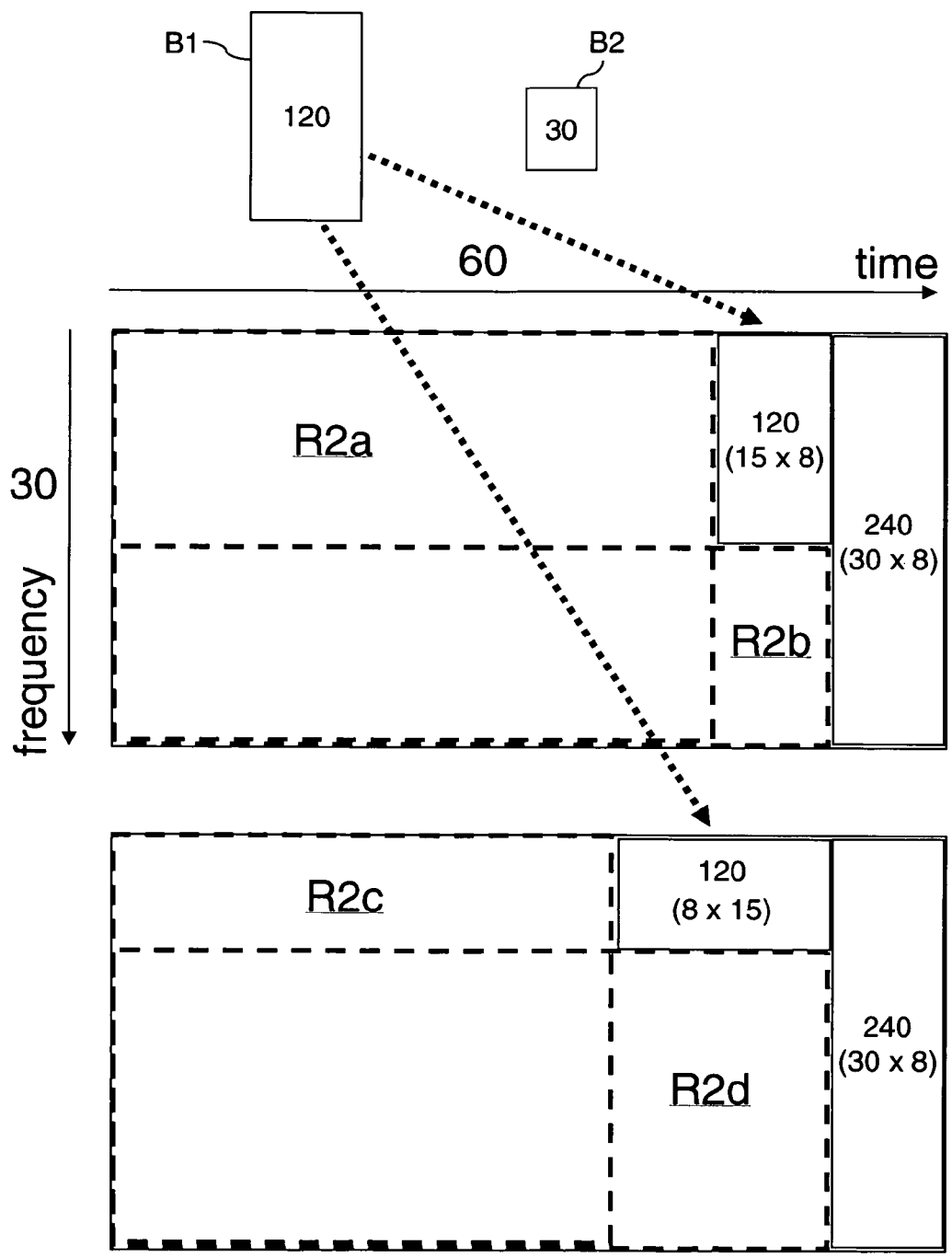

With reference to FIG. 2b, the next burst, i.e. burst B1, is allocated within the OFDMA frame. As mentioned above, the list with the remaining free rectangles includes only the entry R1a. FIG. 2b illustrates exemplary two different possibilities of how to allocate burst 82 with a total area of 120 units. In the upper part of FIG. 2b a 15×8 distribution is shown. Such allocation of burst 82 results in two free rectangles R2a and R2b (again indicated by dashed line frames). These rectangles are obtained by defragmenting the overall remaining free space. By computing the area of each of the empty rectangles R2a and R2b one will find that rectangle R2a has an area of 30×44=1320 units and that rectangle R2b has an area of 15×52=780 units. The allocation in the lower part of FIG. 2b results in two defragmented rectangles R2c and R2d with the following areas: R2c with 30×37=1110 units and R2d with 22×52=1144 units.

This process is carried out for all dimension permutations, i.e. for 1×120, 2×60, 3×40, 4×30, and so on. It is to be noted that also permutations that require padding are taken into consideration; in the specific case for example the combination 7×17 with one padding unit or the combination 9×13 with three padding units. For each case the sizes of the defragmented remaining free rectangles are calculated. The combination which results in the largest free rectangle is chosen. In the given example the combination illustrated in the upper part of FIG. 2b results in the largest free rectangle which is rectangle R2a with a size of 30×44=1320 units. Consequently, the updated list of data structures that represent the current empty space within the OFDMA frame and which includes the set of defragmented empty rectangles ordered in terms of increasing size would include the rectangle R2b in the first position and the rectangle R2a in the second position.

Figure 2C:
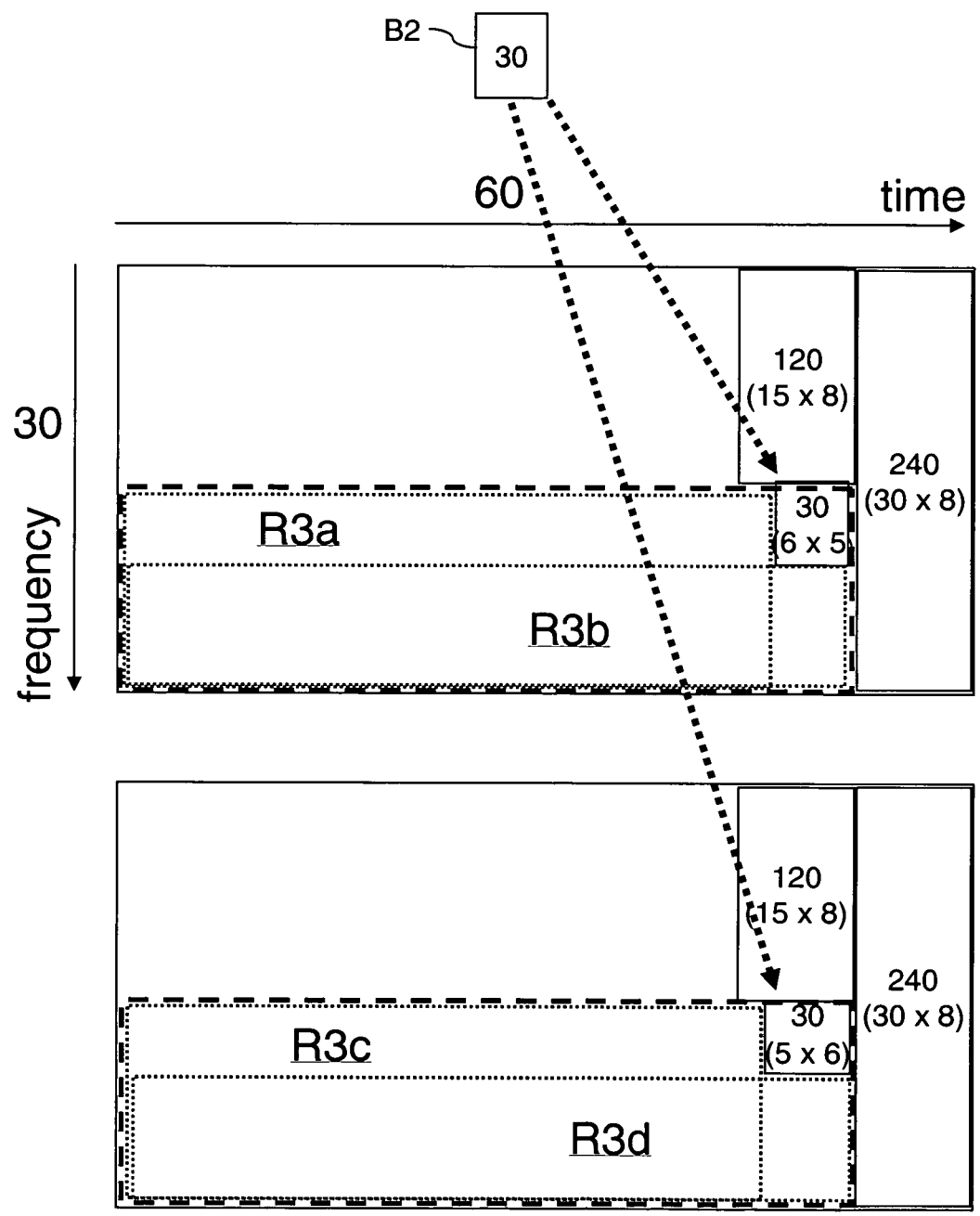

With reference to FIG. 2c, the allocation of the next burst, which is burst 82, is illustrated. From the actual set of empty rectangles (in our case including rectangle R2b and R2a as explained above) the smallest rectangle that can hold the burst to be allocated is chosen as packing area for that burst. As burst 82 includes only 30 units, rectangle R2b with a size of 1110 units is the smallest rectangle out of the current set of empty rectangles that is sufficiently large to hold burst 82. Thus, burst 82 is packed in the upper right hand corner of rectangle R2b. Again, the actual dimensions of burst 82 are determined as described above. Two possible dimension permutations are shown in FIG. 2c for the purpose of illustration. It turns out at the combination shown in the upper part of FIG. 2c—after defragmentation of the packing area—results in the largest free rectangle which is indicated by the dotted line frame and which is labelled R3a. Rectangle R3a has a size of 15×47=705 units. Consequently, after having allocated burst 83 the set of empty rectangles is updated such that it includes the rectangles R3b (size: 468 units), R3a (size: 705 units), and R2a (size: 1320 units).

In real application scenarios many more bursts will be allocated within the OFDMA frame. For each burst the allocation process will follow the same rules as described above in connections with the allocation of bursts B1, B2, and B3. The allocation process will be terminated if the number of units required for allocating any remaining burst is larger than the size of the largest free rectangle.

Many modifications and other embodiments of the invention set forth herein will come to mind the one skilled in the art to which the invention pertains having the benefit of the teachings presented in the foregoing description and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A method of assembling a frame in an Orthogonal Frequency Division Multiple Access (OFDMA)-based communication system, comprising:
   generating data packets to be transmitted from a broadcast station to a receiver into bursts that include either one of a single data packet or a plurality of concatenated data packets; and
   filling an OFDMA frame with said bursts, the OFDMA frame having a rectangular shape in terms of two dimensions, the two dimensions being time and frequency,
   wherein said filling includes performing an evaluation of a rectangular shaping or dimensioning of the bursts in terms of slots and subchannels of the OFDMA frame, and successively fitting said bursts into the OFDMA frame by means of a frame assembly scheduler based on said evaluation,
   wherein the frame assembly scheduler is configured to perform a filling of the OFDMA frame based on an ordered list of rectangular data structures that represent a current unallocated space within the OFDMA frame, and
   wherein, in said evaluation, a smallest rectangle of unallocated space, of a plurality of rectangles of unallocated space of the OFDMA frame, that can hold a burst to be allocated, is selected as a packing area for said burst so that a size of a largest rectangle of unallocated space in a remaining defragmented rectangle of unallocated space of the OFDMA frame is maximized.

2. The method according to claim 1, wherein the data packets to be transmitted, before being allocated in the OFDMA frame, are divided into urgent data packets and into non urgent data packets.

3. The method according to claim 2,
   wherein the urgent data packets are allocated first, and
   wherein a remaining space of the OFDMA frame is used to allocate the non urgent data packets.

4. The method according to claim 2, wherein a concatenation of data packets is performed separately for urgent data packets and for non urgent data packets.

5. The method according to claim 1, wherein said bursts are generated by concatenating said data packets.

6. The method according to claim 5, wherein a concatenation of data packets from different connections is performed in accordance with a modulation coding scheme of the data packets.

7. The method according to claim 5, wherein a threshold is applied specifying a maximal admissible size of a burst.

8. The method according to claim 1, wherein the data packets/bursts are packed into the OFDMA frame in a descending order based on sizes of the data packets/bursts, beginning with the largest data packet/burst.

9. The method according to claim 1, wherein the remaining unallocated space of the OFDMA frame, after fitting a burst into the OFDMA frame, is defragmented into a set of unallocated rectangles.

10. The method according to claim 9, wherein each burst is fitted into the OFDMA frame either vertically or horizontally, and a determination of whether to fit the burst vertically or horizontally takes place based on producing a result in the remaining unallocated space of the ODFMA frame so that a size of a rectangle in resulting defragmented unallocated rectangles in the remaining unallocated space is maximized.

11. The method according to claim 9, wherein the rectangular shaping or dimensioning is performed in such a way that a padding is kept below a predetermined threshold.

12. The method according to claim 1, wherein said ordered list of data structures that represent the current unallocated space within the OFDMA frame includes a set of unallocated rectangles ordered in terms of increasing size.

13. The method according to claim 12, wherein a packing area for the next burst to be placed in the OFDMA frame is selected from said ordered list as a smallest unallocated rectangle that can hold said next burst.

14. The method according to claim 13, wherein the bursts are placed in an upper right corner of the selected packing area.

15. The method according to claim 1, wherein, prior to the step of fitting the bursts into the OFDMA frame, the FCH, the UL-MAP, and the DL-MAP are placed in the upper left hand corner of the OFDMA frame.

16. The method according to claim 1, wherein, before starting the allocation of data packets/bursts into the OFDMA frame, a virtual packing is performed for the calculation of a heuristic value for an initial size of the DL-MAP.

17. The method according to claim 1, wherein, upon a determination that space is inadequate to increase a DL-MAP, the OFDMA frame filling is terminated.

18. The method according to claim 1, wherein, upon a determination that a number of units required for allocating any of remaining bursts is larger than the size of the largest defragmented remaining unallocated rectangle, the OFDMA frame filling is terminated.

19. The method according to claim 1, wherein after a termination of the filling, an array of packed bursts and an array of unpacked bursts are generated.

20. A communication system for accomplishing a method of assembling a frame in an Orthogonal Frequency Division Multiple Access (OFDMA)-based communication system, comprising:
   a broadcast station for Orthogonal Frequency Division Multiple Access (OFDMA)-based transmission of data packets to a receiver;
   a data packet shaping entity that concatenates data packets into bursts to be transmitted as a rectangular shape in terms of two dimensions of an OFDMA frame, said bursts including either of a single data packet or a plurality of concatenated data packets; and
   a frame assembly scheduler that successively fits said bursts into the OFDMA frame, the frame assembly scheduler being configured to perform a process of filling the OFDMA frame based on an ordered list of rectangular data structures that represent a current unallocated space within the OFDMA frame,
   wherein the data packet shaping entity, prior to fitting said bursts into the OFDMA frame, evaluates a rectangular shaping or dimensioning of the bursts in terms of slots and subchannels of the OFDMA frame and selects a smallest rectangle of the OFDMA frame that i) can hold a burst to be allocated and ii) results in a largest defragmented remaining rectangle of unallocated space of the OFDMA frame.

21. The communication system according to claim 20, wherein the frame assembly scheduler permits concatenation of data packets from different connections in single bursts.

22. The communication system according to claim 20, wherein, in evaluating the rectangular shaping or dimensioning of the bursts, the data packet shaping entity analyzes all possible burst dimensions, and identifies the largest defragmented remaining unallocated rectangle independently of a number of padding units.

\* \* \* \* \*